(12) United States Patent
Paquelet

(10) Patent No.: US 7,535,983 B2
(45) Date of Patent: May 19, 2009

(54) METHOD FOR IDENTIFYING THE BEGINNING OF A UWB PULSE SEQUENCE

(75) Inventor: Stephane Paquelet, Rennes Cedex (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 648 days.

(21) Appl. No.: 10/880,664

(22) Filed: Jul. 1, 2004

(65) Prior Publication Data

US 2005/0031043 A1 Feb. 10, 2005

(30) Foreign Application Priority Data

Jul. 30, 2003 (EP) .................................. 03291902

(51) Int. Cl.
*H04L 7/00* (2006.01)
(52) U.S. Cl. .................. 375/368; 375/130; 375/135; 375/136; 375/146; 375/147; 375/150; 375/145; 375/149; 375/240.28; 375/268; 375/279; 375/300; 375/308
(58) Field of Classification Search ............... 375/130, 375/135, 136, 146, 147, 150, 145, 149, 240.28, 375/268, 279, 300, 308
See application file for complete search history.

(56) References Cited

U.S. PATENT DOCUMENTS

| | | | |
|---|---|---|---|
| 5,666,379 A * | 9/1997 | Ovard et al. ................. | 375/239 |
| 5,832,035 A | 11/1998 | Fullerton | |
| 6,317,452 B1 * | 11/2001 | Durrant et al. ............... | 375/130 |
| 6,959,032 B1 * | 10/2005 | Richards et al. ............. | 375/138 |
| 7,010,056 B1 * | 3/2006 | McCorkle et al. ........... | 375/295 |
| 7,187,715 B2 * | 3/2007 | Balachandran et al. ...... | 375/242 |
| 7,221,911 B2 * | 5/2007 | Knobel et al. ................. | 455/42 |
| 2001/0053175 A1 * | 12/2001 | Hoctor et al. ................ | 375/130 |
| 2002/0018514 A1 * | 2/2002 | Haynes et al. ............... | 375/130 |

FOREIGN PATENT DOCUMENTS

WO WO 01/93444 A1 12/2001

OTHER PUBLICATIONS

U.S. Appl. No. 10/946,249, filed Sep. 22, 2004, Paquelet et al.
U.S. Appl. No. 10/950,505, filed Sep. 28, 2004, Paquelet.

* cited by examiner

*Primary Examiner*—Shuwang Liu
*Assistant Examiner*—Kabir A Timory
(74) *Attorney, Agent, or Firm*—Oblon, Spivak, McClelland, Maier & Neustadt, P.C.

(57) ABSTRACT

A method for transmitting data in the form of pulse sequences, including a signal synchronization step carried out by a receiver of dataframes DF, in the course of which at least one time window $\Delta T(0)$ is scanned in search of the beginning PSB of a pulse sequence. The time window is then subdivided into a predefined number of sub-windows $\Delta T(1)$. The sub-windows are then scanned during further signal detection steps until the beginning PSB of the pulse sequence has been detected within one of the sub-windows which will then be substituted for the previous time window $\Delta T(0)$, until the width of the resulting sub-windows becomes smaller than a predetermined minimum width.

17 Claims, 5 Drawing Sheets

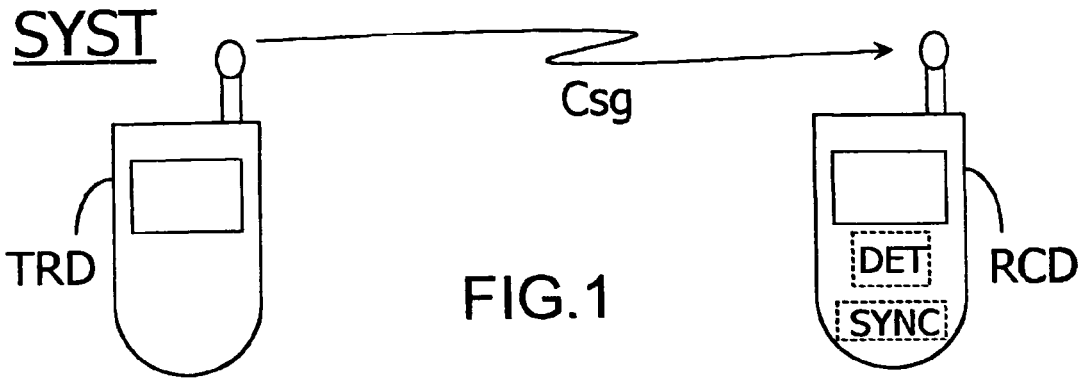
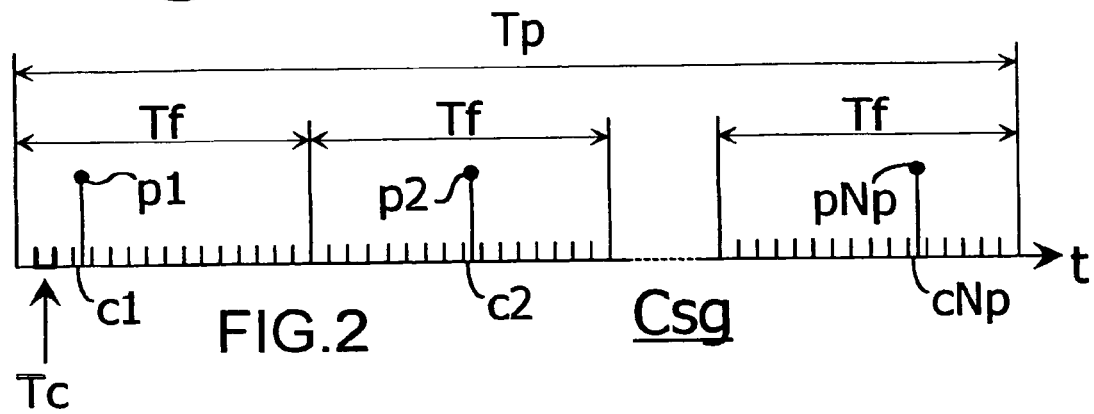
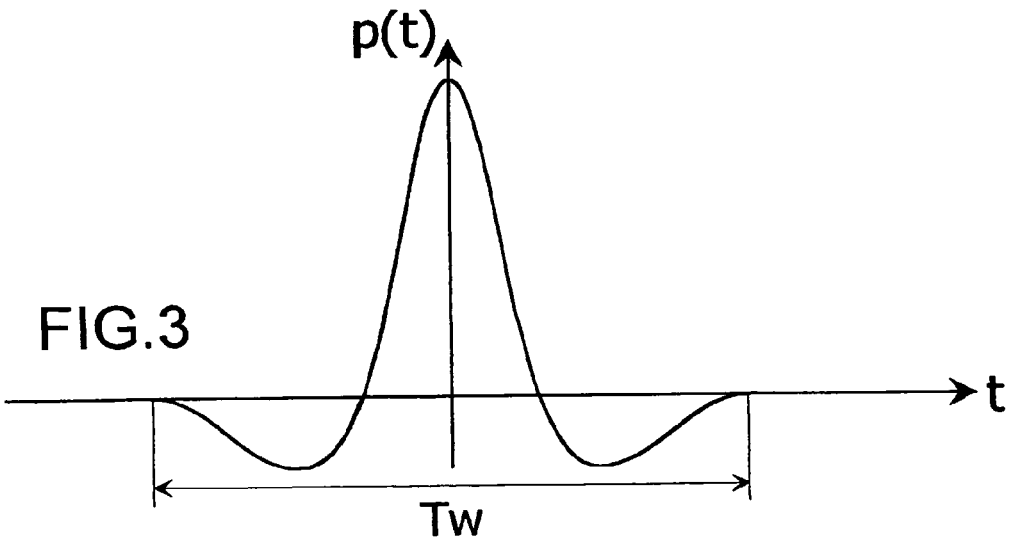
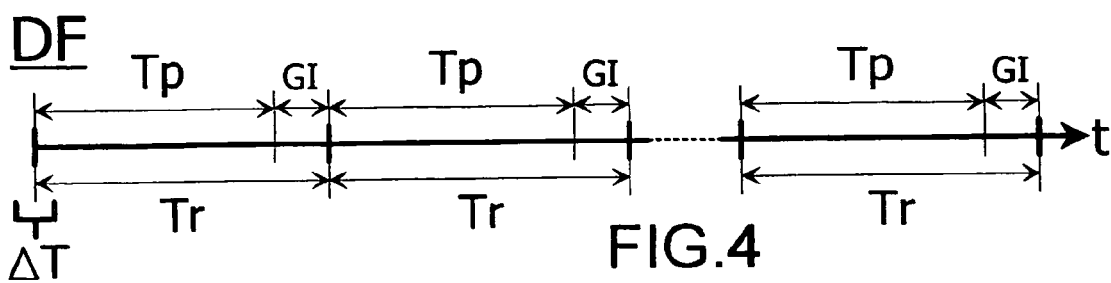

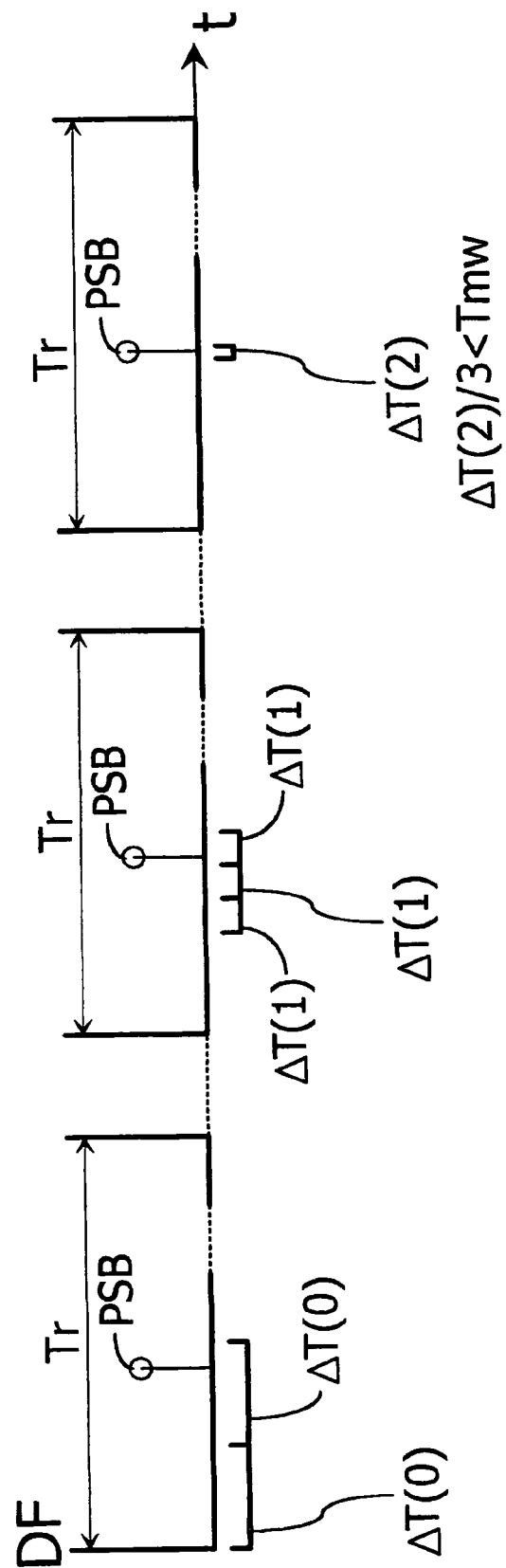

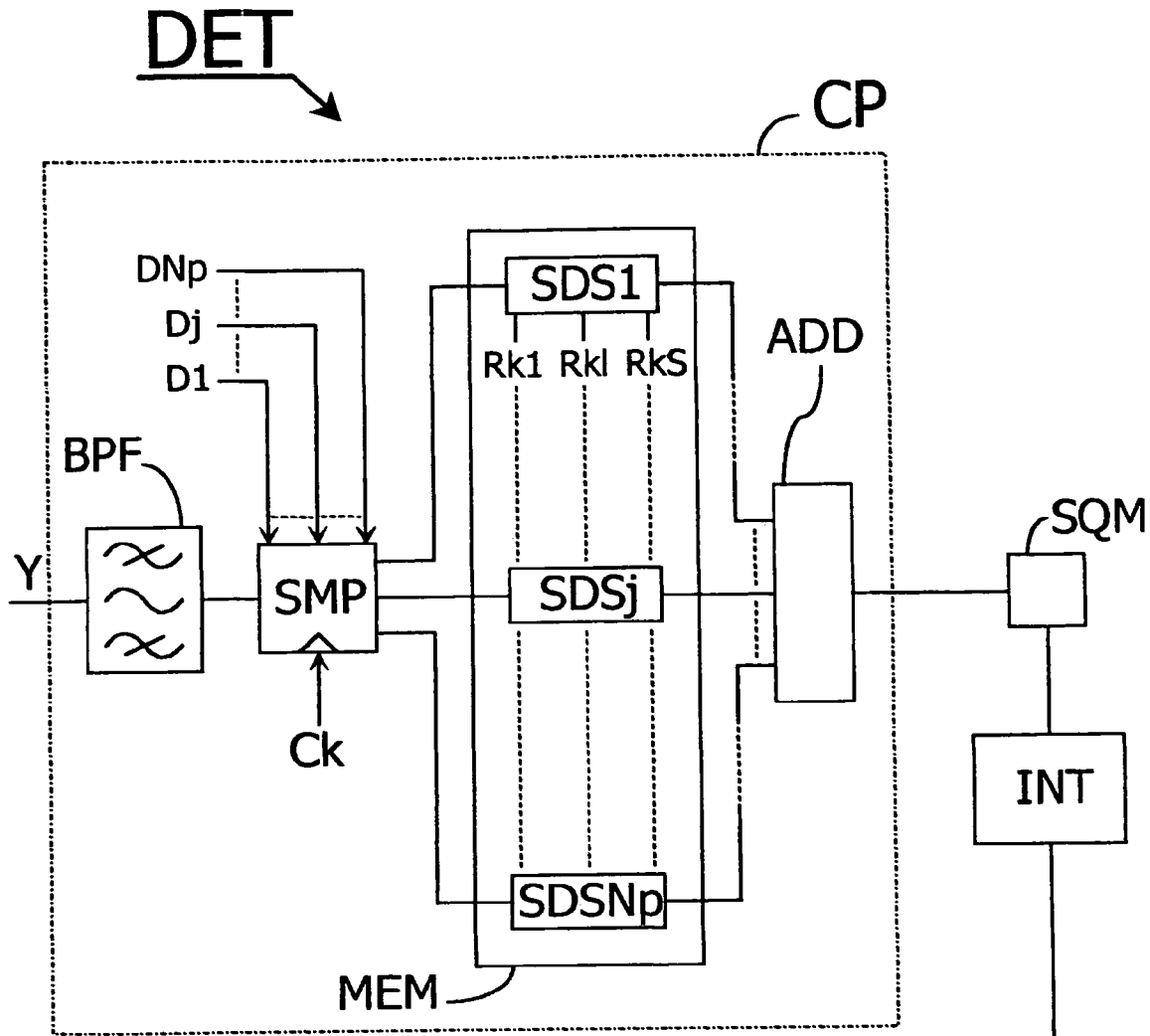
FIG.8
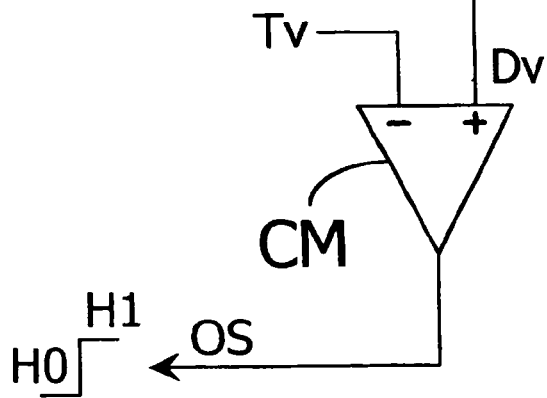

METHOD FOR IDENTIFYING THE BEGINNING OF A UWB PULSE SEQUENCE

BACKGROUND OF THE INVENTION

1. Field of the Invention

The present invention relates to a method for transmitting data in a telecommunication system including at least one transmitter and one receiver, said transceiver being intended to transmit a signal formed by at least one sequence of Np pulses over Np time windows, each pulse being enclosed within a time chip whose position whithin its relevant time window is defined by a chip number.

2. Discussion of the Background

Such data transmission methods are currently studied with the aim of assessing the relevance of so-called Ultra-Wide Band telecommunication systems (further referred to as UWB systems). In such a system each transmitter may be identified by a signature formed by the above-mentioned chip numbers, which signature is in itself quite sturdy and may thus be reliably and accurately communicated to all potential receivers.

The pulses used in UWB systems are very short, having for example a duration lower than 0.1 nanosecond, which offers to such systems bandwidths at least as large as 10 GigaHertz, entailing high flexibility and hence numerous possible applications for such systems.

The above-described signal may form a carrying signal on which information can be encoded by modulation of said carrying signal, for example by performing phase or amplitude modulation of one or more pulse sequences.

In currently used telecommunication systems, a transmitter of data usually inserts a header to be transmitted before transmitting the actual information contained in the modulated signal. This header includes pulse sequences describing predetermined reference symbols, which are known beforehand by the receiver, so that said receiver may judge, by analyzing received symbols representative of said reference symbols, how communication conditions between the transmitter and the receiver actually affect the transmitted data. This analyzis of the received reference symbols enables the receiver to adjust a processing to which further pulse sequences carrying said actual information will be subjected to by the receiver.

The receiver must thus be able to identify the received reference symbols, and, to this end, be able to precisely identify the beginning of a pulse sequence carrying such a reference symbol. Such an identification of the beginning of a sequence is often referred to as a detection and synchronization step by those skilled in the art.

In the present state of the art, signal detection and synchronization is often performed by correlating a received signal delivered at the output of a receiving antenna, which received signal may be exclusively constituted by noise or, alternatively, may include an incoming carrying signal, with a gliding model of the waveform such a carrying signal should have.

Though such a gliding correlation technique enables to map a whole pulse sequence and thus allows a detection and an identification of the beginning of the sequence, this technique is not realistically applicable as such to the detection of sequences of Np pulses lasting less than 0.1 ns each and enclosed in time windows having each a width of roughly 100 ns. In such an example, with for example Np=128 and a sampling interval of 10 ps, the scanning of the whole duration of a pulse sequence would require $1,28.10^6$ successive pulse sequences for its completion and would then last 16 seconds, which is not acceptable.

It should be also be noted that, during the considerable time required for performing the mapping of a pulse sequence according to the gliding correlation technique described above, communication conditions between the transmitter and the receiver may change, i.e. a communication channel between these devices may be altered, for example due to movements of one or both devices, so that the communication conditions may be altered in the course of a single signal detection and synchronization step, with adverse effects on the accuracy of the results yielded by said signal detection and synchronization step. The signal carrying the pulse sequences may even disappear before its very detection is completed.

SUMMARY OF THE INVENTION

The invention aims at solving the aforementioned problems, by providing a method for transmitting data as described above, which method allows to identify the beginning of a pulse sequence without requiring an exhaustive mapping of said sequence.

Indeed, a method for transmitting data according to the opening paragraph is characterized according to the invention in that it includes at least one signal synchronization step in the course of which at least one time window having a predermined width is scanned during a signal detection step in search of the beginning of a pulse sequence, said time window being then subdivided into a predefined number of sub-windows if the beginning of a pulse sequence has been detected within said time window, which sub-windows are then to be scanned during further signal detection steps in search of the beginning of said pulse sequence until such a beginning has been detected whithin one of said sub-windows which will then be substituted for the previous time window, until the width of the resulting sub-windows becomes smaller than a predetermined minimum width.

In the synchronization method according to the invention, the received signal is not scanned exhaustively during the whole duration of an expected pulse sequence, as is done in the known gliding correlation technique. The scanning is instead restricted to selected portions of the expected pulse sequence. This restriction is a consequence of a difference in purpose between the synchronization step according to the invention and the detection and synchronization methods already known in the art.

Indeed, a known detection and synchronization method performed by means of a gliding correlation over the whole duration of an expected pulse sequence aims at identifying precisely the timing of the detected sequence, whereas the detection steps carried out in the course of the synchronization step according to the invention only aim at determining whether or not a given pulse sequence starts within a given time interval and further subdivisions thereof.

During the first detection step to be carried out, the whole duration of a single sequence may thus be scanned stepwise, each step having a duration of the order of 10 ns in the same conditions as those described above, which means that the scanning of the whole duration of an expected sequence of Np=128 pulses would then only require $1,28.10^3$ successive pulse sequences for its completion and would last 16 milliseconds, i.e. one thousand times less than according to the gliding correlation technique described above. The further detection steps will, of course, be carried out more swiftly since the associated time intervals to be scanned will be far shorter.

According to a specific embodiment of the invention, the signal detection steps to be executed during the synchronization step may be carried out far more quickly than according to currently used techniques.

During such a signal detection step, Np detection windows encompassing the time chips defined by the chip numbers are to be examined in search of an expected pulse sequence.

This specific embodiment of the invention enables to further reduce the processing time and power required for carrying out the synchronization method by only scanning detection windows defined by the signature of the transmitter, which will have been communicated beforehand to the receiver.

Various techniques may be used during such a detection step for examining the detection windows in search of a pulse.

According to a first variant of this specific embodiment of the invention, the examination of each detection window involves the computation of a detection value defined by a mean value over all detection windows of a correlation between the received signal and a series of Np expected pulse forms, which detection value is to be compared to a predetermined threshold value.

The correlation value may advantageously be raised to any given power N greater than 1 in order to increase the statistical relevance of occurrences where pulses are detected in an expected configuration.

According to a second variant of this specific embodiment of the invention, the examination of each detection window involves the computation of a detection value defined by a mean value over all detection windows of a squared value of a correlation between the received signal and a series of Np expected pulse forms, which detection value is to be compared to a predetermined threshold value.

As will be explained hereinafter, the use of a squared correlation value will additionally allow an easy emplementation of the computation of the detection value.

The above-mentioned predetermined threshold value will preferrably be independent of an amplitude of the received signal, in order to ensure that communication conditions such as channel attenuation have no significant impact on the outcome of the signal detection step.

According to one of its hardware-oriented aspects, the invention also relates to a telecommunication system including at least one transceiver and one receiver, said transmitter being intended to transmit a signal formed by at least one sequence of Np pulses over Np time windows, each pulse being enclosed within a time chip whose position whithin its relevant time window is defined by a chip number, system in which the receiver includes signal synchronization means intended to identify at least one time window having a predetermined width to be scanned by signal detection means in search of the beginning of a pulse sequence, said time window being then subdivided into a predefined number of sub-windows if the beginning of a pulse sequence has been detected within said time window, which sub-windows are then in turn to be scanned by said signal detection means in search of the beginning of said pulse sequence until such a beginning has been detected whithin one of said sub-windows which will then be substituted for the previous time window, until the width of the resulting sub-windows becomes smaller than a predetermined minimum width.

According to a specific embodiment of such a system, the signal detection means are intended to perform an examination of Np detection windows encompassing the time chips defined by the chip numbers in search of an expected pulse sequence.

According to a first variant of such a specific embodiment, the detection means include computation means for computing a detection value defined by a mean value over all detection windows of a correlation between the received signal and a series of Np expected pulse forms, and comparison means for comparing said detection value to a predetermined threshold value.

According to a second variant of such a specific embodiment, the detection means include computation means for computing a detection value defined by a mean value over all detection windows of a squared value of a correlation between the received signal and a series of Np expected pulse forms, and comparison means for comparing said detection value to a predetermined threshold value.

According to a possible embodiment of such a second variant, the computation means include:
- a plurality of correlating modules, each of which being intended to be activated during the Np detection windows and to compute a correlation over said detection windows between a signal received by the receiver and a characteristic signal associated with said correlating module,
- a plurality of accumulating modules, each of which being intended to accumulate output values delivered by one of said correlating modules,
- a plurality of squaring modules, each of which being intended to produce a squared value of the contents of one of said accumulating modules, and
- an additioner intended to compute a sum of output values delivered by the squaring modules in order to produce a detection value which will be compared to the predetermined threshold value.

According to another possible embodiment of the above-described second variant, the computation means include:
- at least one band-pass filter intended to be fed with a signal received by the receiver,
- a sampling module intended to be activated during the detection windows and to convert a signal delivered by the band-pass filter into a series of digital samples,
- memory means in which successive series of samples delivered by the sampling module are intended to be stored,
- an additionner intended to deliver a series of accumulated samples, each accumulated sample resulting from a sum of all samples having a same rank among the various series of samples stored within the memory means, and
- an integrator intended to compute a mean-square value over all detection windows of the accumulated samples delivered by the additionner, which mean-square value will constitute the detection value.

According to another of its hardware-oriented aspects, the invention also relates to a device intended to receive a signal formed by at least one sequence of Np pulses over Np time windows, each pulse being enclosed within a time chip whose position whithin its relevant time window is defined by a chip number, which device includes signal synchronization means intended to identify at least one time window having a predermined width to be scanned by signal detection means in search of the beginning of a pulse sequence, said time window being then subdivided into a predefined number of sub-windows if the beginning of a pulse sequence has been detected within said time window, which sub-windows are then in turn to be scanned by said signal detection means in search of the beginning of said pulse sequence until such a beginning has been detected whithin one of said sub-windows which will then be substituted for the previous time window, until the width of the resulting sub-windows becomes smaller than a predetermined minimum width.

According to a specific embodiment of such a receiving device, the signal detection means are intended to perform an examination of Np detection windows encompassing the time chips defined by the chip numbers in search of an expected pulse sequence.

The detection means included in such a receiving device will thus be able to execute a signal detection step according to the above-described embodiments of the invention.

BRIEF DESCRIPTION OF THE DRAWINGS

The characteristics of the invention mentioned above, as well as others, will emerge more clearly from a reading of the following description given in relation to the accompanying figures, amongst which:

FIG. 1 is a functional diagram depicting a telecommunication system in which the invention is used;

FIG. 2 is a chronogram depicting a pulse sequence constituting a carrying signal transmitted in such a telecommunication system;

FIG. 3 is a chronogram depicting a pulse model which may be used for generating such a sequence;

FIG. 4 is a chronogram depicting a data frame including a plurality of pulse sequences;

FIG. 5 is a chronogram depicting a signal synchronization method according to the invention;

FIG. 8 is another block diagram depicting detection means according to another specific embodiment of the invention.

DETAILED DESCRIPTION OF THE INVENTION

Figure 6:
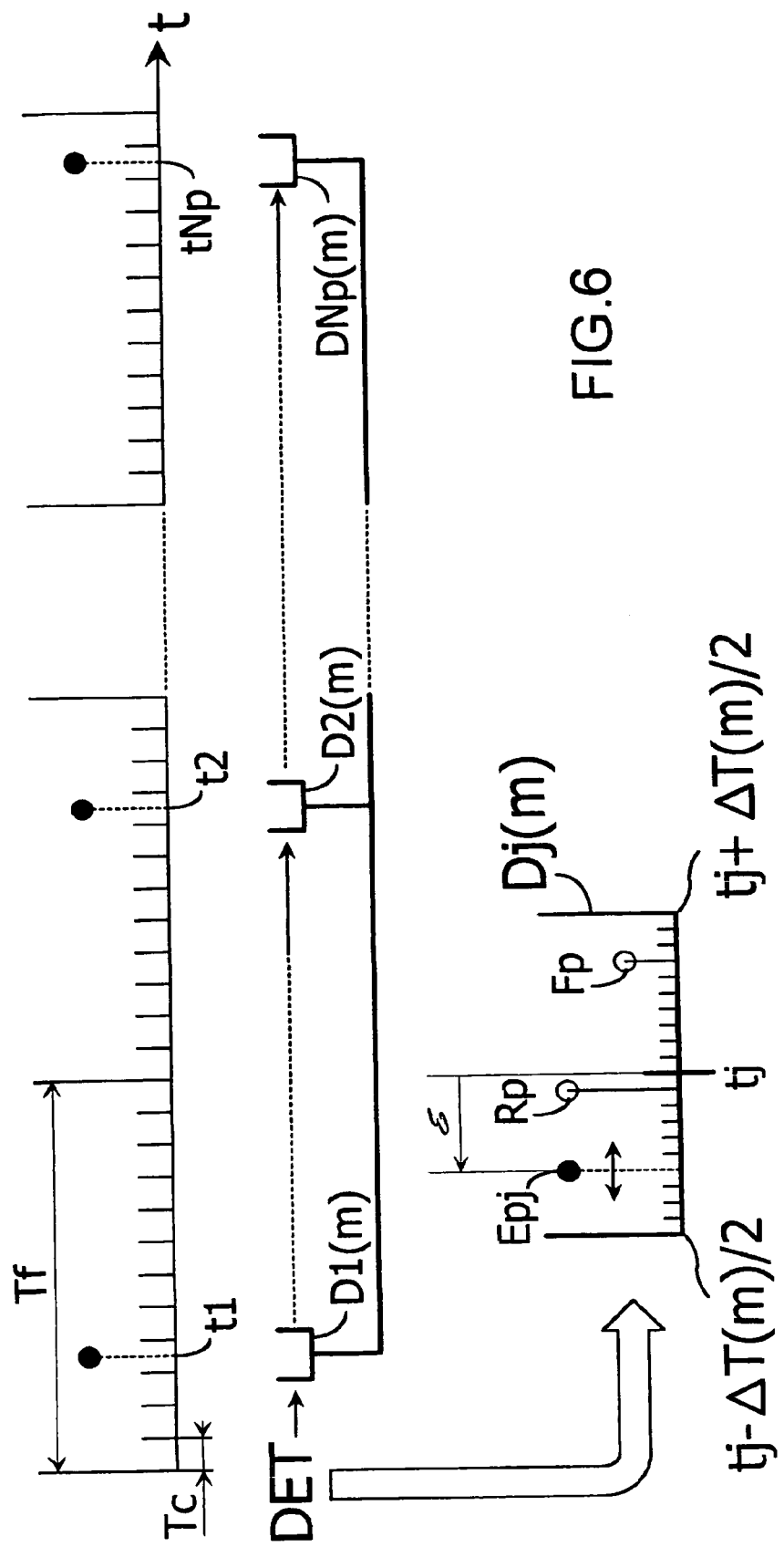
FIG. 6 is a chronogram depicting a signal detection step according to the invention.

FIG. 1 depicts a telecommunication system SYST in which the invention is embodied. This system SYST includes at least one transmitting device TRD and one receiving device RCD, which may for example be constituted by mobile phones. The transmitting device TRD is intended to transmit a signal Csg formed by at least one sequence of Np pulses pj (for j=1 to Np) over Np time windows, each pulse being enclosed within a time chip whose position whithin its relevant time window is defined by a chip number cj (for j=1 to Np).

This signal Csg may form a carrying signal on which information can be encoded by the transmitting device TRD by means of a modulation of said carrying signal Csg, for example by performing phase or amplitude modulation of one or more pulse sequences.

The receiver REC is provided with detection means DET and synchronization means SYNC for detecting such an incoming signal Csg and identifying the beginning of the pulse sequences included in said incoming signal Csg.

FIG. 2 depicts such an incoming signal Csg in the form of a chronogram, according to which each pulse sequence has a total duration duration Tp divided into time windows having each a duration Tf, each time window being sub-divided into time chips Tc, a single time chip within each window being intended to enclose a pulse pj (for i=1 to Np), which single time chip is identified by means of a chip number cj. The transmitter of this carrying signal Csg will thus be identified by a signature Sg=(c1, c2 . . . cNp) jointly formed by all above-mentioned chip numbers cj (for i=1 to Np), which signature Sg is in itself quite sturdy and may thus be reliably and accurately communicated to all potential receivers.

FIG. 3 is another chronogram which depicts a possible shape p(t) which may be chosen for constituting the above-mentioned pulses. In the example depicted here, this pulse p(t) is defined as a derivative of the second order of a Gaussian function, which may be expressed mathematically as $p(t)=A \cdot [1-4\pi(t/Tw)^2] \cdot \exp(-2\pi(t/Tw)^2)$. Other pulse shapes known to those skilled in the art may, of course, be used in this same purpose.

FIG. 4 is yet another chronogram which depicts a data frame DF formed by successive pulse sequences such as the one described above, each having a total duration Tp, a guard interval GI being periodically inserted between two such sequences in order to prevent alteration of a given sequence by a following one, which alterations could be caused, for example, by intermodulation products between said pulse sequences. This dataframe DF is thus constituted by successive frames having each a duration Tr, whith Tr=Tp+GI, and including each a pulse sequence as described above.

According to the invention, in order to synchronize a processing to be applied to this dataframe DF, a device intended to receive said data frame DF must be able to detect the beginning of a pulse sequence such as those described above during a given time interval $\Delta T$ where $\Delta T$ may be reduced to a predetermined synchronization threshold $\Delta Tt$.

FIG. 5 depicts a signal syncronization step which is to be carried out in this purpose by the synchronization means. In an initial stage of the signal synchronization step, the initial width of the time window to be scanned by the detection means will be set to a predetermined value $\Delta T(0)$, which will later be reduced very quickly. The received dataframe DF is then scanned by shifting the position of said time window within the width Tr of an expected pulse sequence until the beginning PSB of such a pulse sequence is found. The former window $\Delta T(0)$ is then divided into sub-windows $\Delta T(1)$, for example by dividing it into P sub-windows of equal duration. In this example, P is chosen equal to 3. Each of these sub-windows $\Delta T(1)$ is then scanned by the detection means until the beginning PSB of the detected pulse sequence is identified within one of these sub-windows $\Delta T(1)$, which will then be divided into former sub-windows $\Delta T(2)$ and so on.

This process thus requires to scan only the contents of selected time windows $\Delta T(m)$, which will have a width far smaller than the width Tr of a whole pulse sequence, so that this process converges quite quickly towards a state in which the width of the sub-windows, e.g. T(3) not shown here, into which the latest detection window T(2) is to be divided becomes lower than a predetermined minimum width Tmw, which means that the method according to the invention may be carried out far more quickly than the known detection and synchronization methods.

FIG. 6 depicts how a pulse sequence may advantageously be detected within a time window $\Delta T(m)$ resulting from the mth subdivision of the initial time window $\Delta T(0)$. According to this embodiment of the invention, the signal detection means DET included in a receiving device are intended to examine Np detection windows Dj(m) (for j=1 to Np) encompassing the time chips defined by the chip numbers in search of pulses belonging to an expected pulse sequence, which pulses are shown in dashed lines in this Figure. A first moment t1 corresponding to the first chip number is positioned at the center of the time window $\Delta T(m)$ resulting from the ith subdivision of the initial time window $\Delta T(1)$, which determines, together with all other chip numbers, the position of all other moments tj (for j=2 to Np). Each detection window Dj(m) (for j=1 to Np) is centered on one of these moments tj, is wider than a single time chip duration Tc, and has a duration ΔT(m), which means that carrying out the detection step DET depicted here amounts to providing an answer to a problem consisting for a receiving device in determining if a pulse sequence transmitted under a known signature and intended to be received by said device has or not started during time interval ΔT(m).

The detection step according to this embodiment of the invention only requires to scan selected time windows Dj(m) centered on moments tj (for j=1 to Np) defined by their respective associated chip numbers, in search of expected pulses.

This enables to determine in a single step if a given pulse sequence starts or not within a given time interval ΔT, whereas in the known gliding correlation technique, such a statement may only be established after performing numerous elementary correlations for achieving an exhaustive scanning of the whole duration Tp of said given sequence.

A possible way of carrying out the scanning of the detection windows Dj(m) centered on given instants tj and defined by lower and upper bounds respectively equal to tj−ΔT(m)/2 and tj+ΔT(m)/2 is also shown in this Figure. In this example, a detection value defined by a mean value over all detection windows of a correlation between the received signal and a series of Np expected pulses Epj is computed. This detection value will then be compared to a predetermined threshold value.

The computation of this detection value is performed by successively shifting by an amount ε a series of Np patterns Epj representing each an expected pulse, from the lower bounds tj−ΔT(m)/2 to the upper bounds tj+ΔT(m)/2 of all scanned detection window Dj(m), and computing, for each value of ε, a scalar product between a vector representing said series of Np patterns Epj and the received signal, and accumulating the successive computed values of this scalar product, which constitutes a correlation between the the received signal and the series of Np expected pulse forms Epj.

This correlation will preferably be squared so as to emphasize occurrences where a received pulse Rp is indeed present within detection window Dj, with respect to freak occurrences where a noise peak Fp may produce a significant value of the scalar product described above, the amplitude of such a noise peak being lower than that of an actually received pulse Rp.

The inventor has furthermore observed that the use of a squared correlation value also enables to simplify the emplementation of the detection step, as will now be explained. In the following, the duration ΔT(m) of a time window in which the beginning of a pulse sequence is sought, and resulting from an mth subdivision of an initial time window T(0), will be noted ΔT.

If the above-described squared correlation is noted $(y|s(.-\epsilon))^2$, where s and y are vectors representing the expected signal s(t) and the received signal y(t), respectively, the corresponding detection value may be expressed as a quadratic form given by:

$$Q(y) = E_\varepsilon\{(y|s(.-\varepsilon))^2\}$$

The received signal y(t) will be deemed corresponding to a state H1 in which y(t)=A.s(t−ε)+n(t), t belonging to [−ΔT/2; Tp+ΔT/2], if Q(y) exceeds a predetermined threshold value noted Tv, the received signal y(t) will be deemed corresponding to a state H0 in which y(t)=n(t) where n(t) is constituted by noise, if Q(y)<Tv.

The predetermined threshold value Tv is defined on the basis of a chosen probability of false alarm noted Pfa, which is the highest possible value for the likelihood of having Q(y)>Tv while being in state H0, y(t) then being expressed as y(t)=n(t), which allows the threshold p to be independent of the amplitude of the expected or received signal.

The inventor has found that the above quadratic form may be reduced in order to ease its emplementation. Indeed, by observing that $y|s(.-\epsilon) = {}^T y.s(.-\epsilon) = {}^T s(.-\epsilon).y$, where y and s are column matrixes, and ${}^T y$ the transposed row matrix of column matrix y, Q(y) may be rewritten in the form $Q(y) = {}^T y.Q.y$, where Q is a matrix having components which do not depend on those of y.

The inventor has also observed that this matrix Q is quite hollow, and may be represented in the following form:

$$Q = \begin{bmatrix} 0 & 0 & 0 & 0 & 0 \\ 0 & M & & M & 0 \\ 0 & & & & 0 \\ 0 & M & & M & 0 \\ 0 & 0 & 0 & 0 & 0 \end{bmatrix},$$

where M is a sub-matrix which may be computed solely on the basis of the shape of the expected pulse p(t), the position of each sub-matrix M in the matrix Q being defined by the positions of the aforementioned detection windows Dj, i.e. each sub-matrix M is centered on a point $a_{l,r}$ of the matrix Q whose coordinates in this matrix are (tl;tr), with l and r=1 to Np.

If each pulse p(t) is as described in FIG. 3, each sub-matrix M may for example be defined by $$M = E_\varepsilon\{(Tw/2)^2 p(.-\varepsilon).^T p(.-\varepsilon)\}.$$

The inventor has observed that each sub-matrix M may be written in the form of a diagonal matrix having diagonal components formed by eigenvalues corresponding to respective eigenvectors Vi (for i=1 to k), so that the quadratic form Q(y) may be rewritten as:

$$Q(y) = \sum_{i=1}^{k} \left( \sum_{j=1}^{Np} \int_{Dj} Vi(t-tj) y(t) \, dt \right)^2,$$

which may be implemented by feeding the received signal y(t) to k correlating modules, each of which being intended to be activated during the Np detection windows and to compute a correlation over said windows between said received signal y(t) and a characteristic signal representative of a eigenvector Vi associated with said correlating module, output values delivered by said correlating modules being then accumulated and squared before being summed together in order to produce a value of Q(y) forming the detection value which will be compared to the predetermined threshold value ρ.

Figure 7:
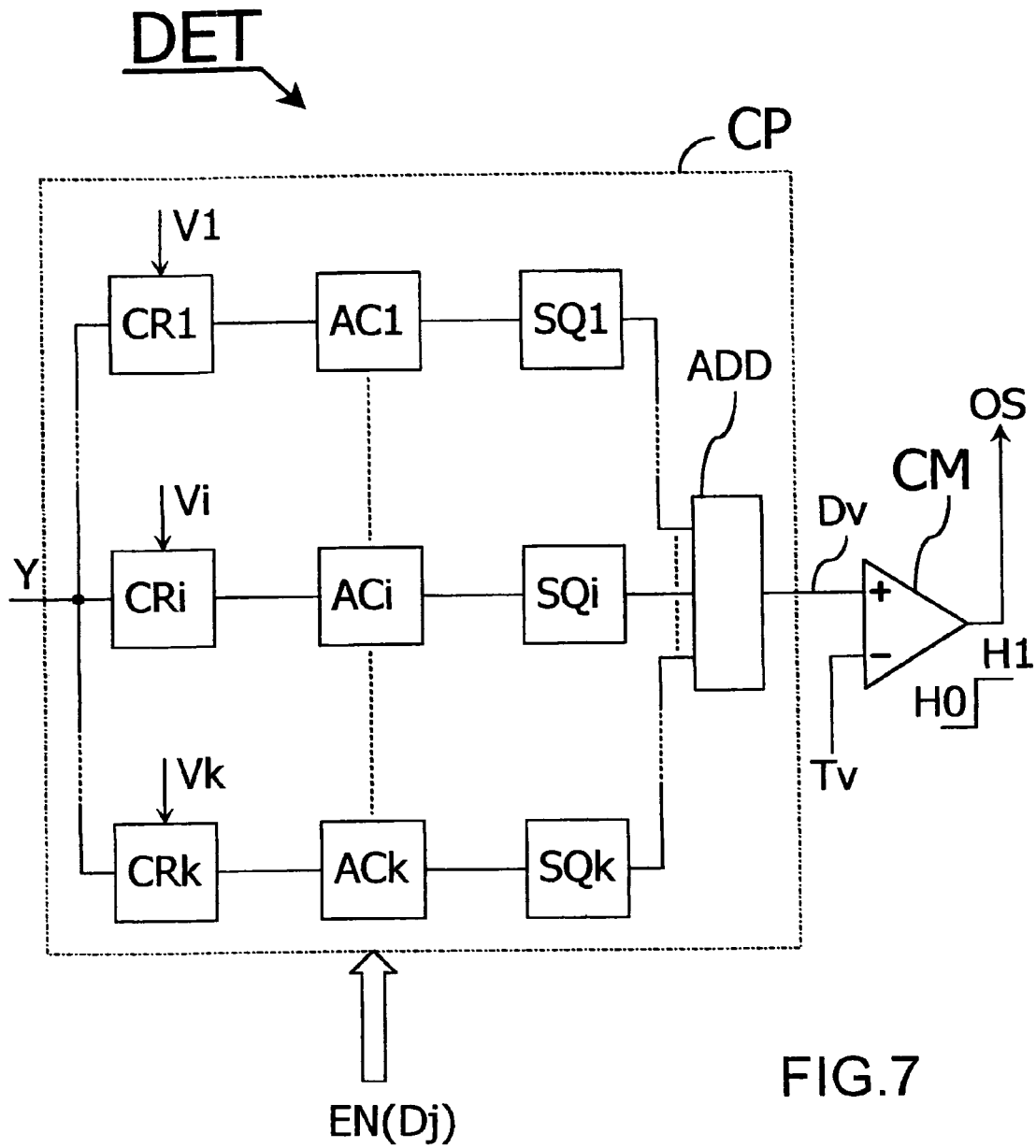
FIG. 7 is a block diagram depicting detection means according to a specific embodiment of the invention.

FIG. 7 schematically shows detection means DET in which the above quadratic form Q(y) is computed by computation means CP in order to produce a detection value Dv, which is to be compared to the threshold value Tv by comparison means CM which may be formed by a simple operational amplifier intended to deliver a two-state output signal OS whose value will determine whether an incoming pulse has been detected or not. The computation means CP are to be activated by means of an enabling signal EN during successive detection windows Dj and include:

- a plurality of correlating modules CRMi (for i=1 to k), each of which being intended to be activated during the Np detection windows and to compute a correlation over said detection windows between a signal Y received by the receiver and a characteristic signal representative of an eigenvector Vi associated with said correlating module CRMi,
- a plurality of accumulating modules ACMi (for i=1 to k), each of which being intended to accumulate output values delivered by one of said correlating modules CRMi,
- a plurality of squaring modules SQMi (for i=1 to k), each of which being intended to produce a squared value of the contents of one of said accumulating modules ACMi, and
- an additioner ADD intended to compute a sum of output values delivered by the squaring modules SQMi in order to produce the detection value Dv which will be compared to the predetermined threshold value Tv.

Such an implementation is quite easy and may be done at a very low cost. Furthermore, all above-described modules may be formed by analog circuits. A commuted filter associated with a Gilbert cell may for example advantageously form each correlating module, the squaring modules may be formed by a Gilbert cell fed with identical input signals, etc. Analog circuits are known for their high processing speed and do not require any sampling, which will enable to further reduce the processing power and the time required for performing a signal detection step according to this embodiment of the invention.

FIG. 8 depicts an alternative embodiment of the detection means DET in which the computation means CP implement the following principles:

The inventor has observed that, by applying a Gaussian reduction, the above expression of the quadratic form Q(y) may be rewritten as:

$$Q(y) = \int_{DNp} (H*y)^2(t) dt,$$

where the symbol * indicates a convolution operation, and $$H = (\sum_j \delta_{Np-tj}) * h,$$

where h is the transfer function of a band-pass filter intended to be fed with the received signal y(t), the transfer function h of which band-pass filter will be successively delayed by tNp−tj, the impulsional response of which band-pass filter being determined on the basis of the above-described matrix M and spreading on the whole width Tw of an expected pulse p(t).

The quadratic form Q(y) may thus be written as:

$$Q(y) = \int_{-\Delta T/2}^{\Delta T/2} \left[\sum_j \delta_{-tj} * \upsilon_{|Dj}\right]^2(t) dt,$$

where $\upsilon(t) = h*y(t)$ and $\upsilon_{|Dj}$ indicates a restriction of the signal $\upsilon(t)$ to the detection window Dj.

The expression $$\sum_j \delta_{-tj} * \upsilon_{|Dj}$$

may be construed as being representative of an in-phase sum of Np slices of the output signal of the band-pass filter, which slices are centered on the detection windows Dj.

In order to compute such an in-phase sum, the Np slices may be sampled and then stored in memory means, the in-phase sum being then computed by adding together all samples of a same rank, or re-computed samples of a same rank, in cases where a pre-processing of said samples is necessary.

In accordance with these principles, the computation means CP include, in the alternative embodiment shown in the present FIG. 7:

- at least one band-pass filter BPF intended to be fed with a signal Y received by the receiver,
- a sampling module SMP clocked by a clock signal Ck, which sampling module SMP is intended to be activated during the detection windows Dj (for j=1 to Np) and to convert a signal delivered by the band-pass filter BPF into various series SDSj of S digital samples,
- memory means MEM in which successive series SDSj (for j=1 to Np) of S samples delivered by the sampling module SMP are intended to be stored,
- an additionner ADD intended to deliver a series of S accumulated samples, each accumulated sample resulting from a sum of all samples having a same rank Rkl (for l=1 to S) among the various series SDSj (for j=1 to Np) of S samples stored within the memory means MEM, and
- an integrator INT intended to compute a mean-square value over all detection windows of the S accumulated samples delivered by the additionner ADD, which mean-square value will constitute a detection value Dv intended to be compared by the comparison means CM to a predetermined threshold value Tv.

Such an implementation is quite easy and may be done at a very low cost. If the bandwidth of the received signal Y proves to be too large to be handled as a whole by a single band-pass filter PBF, said filter may be constructed by a plurality of narrower band-pass filters arranged in parallel and covering each a subdivision of the bandwidth of the received signal Y.

The invention claimed is:

1. A method for receiving data in a telecommunication system including at least one transmitter and one receiver, the transmitter being configured to transmit a signal formed by a pulse sequence including a number (Np) of pulses distributed over a number (Np) of time windows, each pulse being enclosed within a time chip having a position within a corresponding time window defined by a chip number, comprising:
   synchronizing, at the receiver, a received signal from the transmitter, the synchronizing including:
      scanning at the receiver the time windows, each having a same predetermined width, until a beginning of the pulse sequence is detected within one of the time windows,
      subdividing only the one of the time windows in which the beginning of the pulse sequence is detected into a plurality of sub-windows, each having a same sub-window width, scanning only the sub-windows until the beginning of the pulse sequence is detected within one of the sub-windows, and identifying the one of the sub-windows in which the beginning of the pulse sequence is detected as the beginning of the pulse sequence if the sub-window width in which the beginning of the pulse sequence is detected is smaller than a predetermined minimum width.

2. A method as claimed in claim 1, further comprising:
searching a number (Np) of detection windows encompassing the time chip in search of an expected pulse sequence during each occurrence of the scanning the time windows.

3. A method as claimed in claim 2, wherein the step of searching a number (Np) of detection windows comprises:
computing a detection value defined by a mean value over all detection windows of a correlation between the received signal and a series of Np expected pulse forms, the method further comprising:
comparing the detection value to a predetermined threshold value.

4. A method as claimed in claim 2, wherein the step of searching a number (Np) of detection windows comprises:
computing a detection value defined by a mean value over all detection windows of a squared value of a correlation between the received signal and a series of Np expected pulse forms, the method further comprising:
comparing the detection value to a predetermined threshold value.

5. A method as claimed in claim 3, wherein the predetermined threshold value is independent of an amplitude of the received signal.

6. A method as claimed in claim 4, wherein the predetermined threshold value is independent of an amplitude of the received signal.

7. A telecommunication system including at least one transmitter and one receiver, the transmitter configured to transmit a signal formed by a pulse sequence including a number (Np) of pulses distributed over a number (Np) of time windows, each pulse being enclosed within a time chip having a position within a corresponding time window defined by a chip number, comprising:

a synchronizer configured to receive a received signal from the transmitter and to identify a time window having a predetermined width, the synchronizer including:

a signal detector configured to scan the time windows, each having the predetermined width, until a beginning of the pulse sequence is detected within one of the time windows, to subdivide only the one of the time windows in which the beginning of the pulse sequence is detected into a plurality of sub-windows each having a same sub-window width, and to scan only the sub-windows until the beginning of the pulse sequence is detected within one of the sub-windows, the signal detector further configured to identify the one of the sub-windows in which the beginning of the pulse sequence is detected as the beginning of the pulse sequence if the sub-window width is smaller than a predetermined minimum width.

8. A telecommunication system as claimed in claim 7,
wherein the signal detector is configured to examine a number (Np) of detection windows encompassing the time chip defined by the chip number in search of an expected pulse sequence.

9. A telecommunication system as claimed in claim 8,
wherein the signal detector is configured to detect a detection value defined by a mean value over all detection windows of a correlation between the received signal and a series of Np expected pulse forms, and to compare the detection value to a predetermined threshold value.

10. A telecommunication system as claimed in claim 8,
wherein the signal detector is configured to detect a detection value defined by a mean value over all detection windows of a squared value of a correlation between the received signal and a series of Np expected pulse forms, and to compare the detection value to a predetermined threshold value.

11. A telecommunication system as claimed in claim 10,
wherein the signal detector comprises:
a plurality of correlating modules, each correlating module configured to be activated during the number (Np) of detection windows and to compute a correlation over the detection windows between the received signal and a characteristic signal associated with the correlating module,
a plurality of accumulating modules, each accumulating module configured to accumulate output values delivered by a corresponding one of the correlating modules,
a plurality of squaring modules, each squaring module configured to produce a squared value of accumulated output values of a corresponding one of the accumulating modules, and
an adder configured to compute a sum of output values produced by the plurality of squaring modules in order to produce a detection value.

12. A telecommunication system as claimed in claim 10,
wherein the signal detector comprises:
at least one band-pass filter configured to filter the received signal,
a sampling module configured to be activated during the detection windows and to convert a signal delivered by the band-pass filter into a series of digital samples,
a memory configured to store a successive series of samples delivered by the sampling module,
an adder configured to deliver a series of accumulated samples, each accumulated sample being a sum of all samples having a same rank among samples stored within the memory, and
an integrator configured to compute a mean-square value over all detection windows of the series of accumulated samples delivered by the adder, the mean-square value comprising the detection value.

13. A device configured to receive a received signal formed by a pulse sequence including a number (Np) of pulses distributed over a corresponding number (Np) of time windows, each pulse being enclosed within a time chip having a position within a corresponding time window defined by a chip number, comprising:
a synchronizer configured to receive the received signal and to identify a time window having a predetermined width, the synchronizer including:
a signal detector configured to scan the time windows, each having the predetermined width, until a beginning of the pulse sequence is detected within one of the time windows, to subdivide only the one of the time windows in which the beginning of the pulse sequence is detected into a plurality of sub-windows each having a same sub-window width, and to scan only the sub-windows until the beginning of the pulse sequence is detected within one of the sub-windows, the signal detector further configured to identify the one of the sub-windows in which the beginning of the pulse sequence is detected as the beginning of the pulse sequence if the sub-window width is smaller than a predetermined minimum width.

14. A device as claimed in claim 13, wherein the signal detector is configured to examine a number (Np) of detection windows encompassing the time chip defined by the chip number in search of an expected pulse sequence.

15. A method as claimed in claim 1, wherein the synchronizing further comprises:
subdividing the one of the sub-windows in which the beginning of the pulse sequence is detected into a plurality of sub-sub-windows, each having a same sub-sub-window width;
scanning the sub-sub-windows until the beginning of the pulse sequence is detected within one of the sub-sub-windows; and
identifying the one of the sub-sub-windows in which the beginning of the pulse sequence is detected as the beginning of the pulse sequence if the sub-sub-window width is smaller than the predetermined minimum width.

16. A telecommunication system as claimed in claim 7, wherein the signal detector is further configured to subdivide the one of the sub-windows in which the beginning of the pulse sequence is detected into a plurality of sub-sub-windows, each having a same sub-sub-window width, to scan the sub-sub-windows until the beginning of the pulse sequence is detected within one of the sub-sub-windows, and to identify the one of the sub-sub-windows in which the beginning of the pulse sequence is detected as the beginning of the pulse sequence if the sub-sub-window width is smaller than the predetermined minimum width.

17. A device as claimed in claim 13, wherein the signal detector is further configured to subdivide the one of the sub-windows in which the beginning of the pulse sequence is detected into a plurality of sub-sub-windows, each having a same sub-sub-window width, to scan the sub-sub-windows until the beginning of the pulse sequence is detected within one of the sub-sub-windows, and to identify the one of the sub-sub-windows in which the beginning of the pulse sequence is detected as the beginning of the pulse sequence if the sub-sub-window width is smaller than the predetermined minimum width.

* * * * *